United States Patent
Nzudie et al.

(10) Patent No.: US 6,174,950 B1
(45) Date of Patent: Jan. 16, 2001

(54) CONCENTRATED AQUEOUS DISPERSIONS OF WATER-SOLUBLE POLYMERS

(75) Inventors: Denis Tembou Nzudie, Beaumont-le-Roger; Didier Vanhoye, Bernay, both of (FR)

(73) Assignee: Elf Atochem S.A., Puteaux (FR)

( * ) Notice: Under 35 U.S.C. 154(b), the term of this patent shall be extended for 0 days.

(21) Appl. No.: 09/013,093

(22) Filed: Jan. 26, 1998

(30) Foreign Application Priority Data

Jan. 24, 1997 (FR) .................................................. 97 00782

(51) Int. Cl.$^7$ .............................. B01D 17/05; C02F 5/12; C08F 2/20; C08F 2/24
(52) U.S. Cl. .......................... 524/460; 252/180; 516/162; 516/180; 524/458; 525/327.6; 526/932
(58) Field of Search ............................ 516/77, 180, 162; 252/180; 524/458; 526/460, 932; 525/327.6

(56) References Cited

U.S. PATENT DOCUMENTS

| | | | |
|---|---|---|---|
| 3,342,787 | * | 9/1967 | Muskat ................................ 516/77 X |
| 4,339,371 | * | 7/1982 | Robinson et al. ................ 524/458 X |
| 4,797,450 | * | 1/1989 | Dehm et al. ................... 525/327.6 X |
| 4,929,655 | * | 5/1990 | Takeda et al. .................... 524/460 X |
| 5,403,883 | * | 4/1995 | Messner et al. ...................... 524/458 |
| 5,587,415 | * | 12/1996 | Takeda .............................. 524/460 X |
| 5,708,071 | * | 1/1998 | Takeda ................................. 524/458 |

FOREIGN PATENT DOCUMENTS

| | | |
|---|---|---|
| 4216167 | 11/1993 | (DE) . |
| 0262945 | 4/1988 | (EP) . |
| 0670333 | 12/1995 | (EP) . |

OTHER PUBLICATIONS

Base De Donnees "Chemical Abstracts" (Serveur: STN); Abr. 111; 115 920, Columbus, Ohio & JP–A–01 094 936 (Idemitsu Petrochem Co.) Apr. 13, 1989.

Il Nuovo Cimento, vol. 16d, No. 7, 1994, Italy, pp. 865–871, J. Koetz et al, "Interactions between poly(diallyldimerthylammonium chloride) . . . ".

Chemical Abstracts, vol. 118, No. 22, 1993, Columbus, Ohio; abstract No. 213747r, p. 14 & JP 04 279 605 A (Mitsubishi Paper Mills).

* cited by examiner

Primary Examiner—Richard D. Lovering
(74) Attorney, Agent, or Firm—Burns, Doane, Swecker & Mathis, L.L.P.

(57) ABSTRACT

Concentrated and low viscosity aqueous dispersions, e.g., opaque emulsions, well suited as flocculants for water treatment, comprise the water-soluble polymerizate of at least one water-soluble hydrophilic monomer A, optionally, at least one amphiphilic comonomer B and/or, also optionally, at least one hydrophobic comonomer C, in the presence of at least one polymeric dispersant incompatible therewith, for example an imidized and salified styrene/maleic anhydride copolymer or poly(diallyldimethylammonium chloride).

19 Claims, No Drawings

CONCENTRATED AQUEOUS DISPERSIONS OF WATER-SOLUBLE POLYMERS

BACKGROUND OF THE INVENTION

1. Technical Field of the Invention

The present invention relates to water-in-water dispersions and more especially, to highly concentrated aqueous dispersions comprising water-soluble polymers and having low viscosity.

2. Description of the Prior Art

Aqueous dispersions of water-soluble polymers are used in various applications and, in particular, as flocculants for the treatment of industrial and municipal waters, the dewatering of sludges, as thickeners and agents for the treatment of soils.

It is known to this art that aqueous water-soluble polymer systems having a high solids content are in the form of a gel and exhibit very high viscosities, which renders them difficult to handle and store. Need exists in this art for such aqueous systems, but which simultaneously have a high solids content and a low viscosity. It is also necessary for such systems to be stable on storage.

U.S. Pat. No. 5,403,883 describes the polymerization, in water, of a mixture of monomers comprising one or more hydrophilic monomers or one or more hydrophobic monomers and, optionally, one or more amphiphilic monomers. The polymerization results in a water-soluble polymer having a high molecular weight. The operation is carried out in the presence of a dispersing polymer incompatible with the water-soluble polymer prepared. The dispersant has a weight-average molecular weight of less than 500,000. A typical dispersant is poly(diallyldimethylammonium chloride), hereinafter denoted as "poly DADMAC."

However, this system of aqueous dispersions exists in the form of a transparent gel having a relatively high viscosity.

SUMMARY OF THE INVENTION

It has now surprisingly been determined that, by using certain other hydrophilic monomers or certain other dispersants, aqueous water-soluble polymer dispersions are prepared which are of low viscosity and which are not gels. These dispersions can also be formulated as opaque emulsions.

DETAILED DESCRIPTION OF BEST MODE AND SPECIFIC/PREFERRED EMBODIMENTS OF THE INVENTION

More particularly according to the present invention, in a first embodiment thereof, a water-soluble polymer comprising recurring structural units (a) of at least one hydrophilic monomer A1, (b) optionally, of at least one amphiphilic monomer B, and, (c) also optionally, of at least one hydrophobic monomer C, is prepared in the presence of a polymeric dispersing agent, incompatible with the water-soluble polymer synthesized, said dispersant comprising vinylaromatic recurring structural units and unsaturated dicarboxylic acid anhydride recurring structural units. The dispersant is imidized and then salified or quaternized. A representative dispersant according to the invention is a styrene/maleic anhydride copolymer imidized and then salified by means of acetic acid, hereinafter denoted by SMA+.

In a second embodiment of the invention, a water-soluble polymer comprising (a') at least one hydrophilic monomer A selected from among at least one hydrophilic monomer A2 and, optionally, at least one hydrophilic monomer A1, (b') optionally, at least one amphiphilic monomer B, and (c') also optionally, at least one hydrophobic monomer C, is prepared in the presence of a dispersing polymer D incompatible with the water-soluble polymer.

The water-soluble monomer A1 must include at least one ionic group. It is advantageously a monomer having the following general formula:

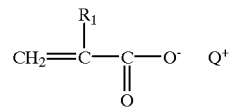

in which $R_1$ is H or methyl, and Q is a positive charged metal ion, such as Na+ or K+, or an ammonium ion NH+, or a monomer having the following general formula:

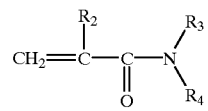

in which $R_2$ is H or methyl, and $R_3$ and $R_4$, which may be identical or different, are each H or a $C_{1-6}$ alkyl or hydroxyalkyl or $C_{5-12}$ cycloalkyl radical, or a monomer having the following general formula:

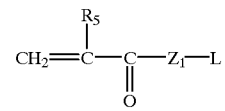

in which $R_5$ is H or $CH_3$, $Z_1$ is 0, NH or $NR_6$, wherein $R_6$ is a $C_{1-6}$ alkyl or hydroxyalkyl radical, and:

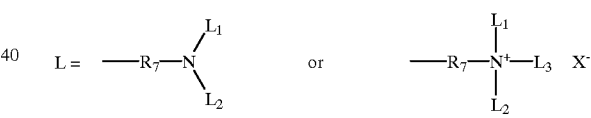

wherein $R_7$ is a $C_{1-6}$ alkylene or hydroxyalkylene radical and $L_1$, $L_2$ and $L_3$, which may be identical or different, are each H or a $C_{1-6}$ alkyl or hydroxyalkyl or $C_{5-12}$ cycloalkyl or $C_{6-12}$ arylalkyl radical.

The preferred monomer A1 according to the invention is acrylamide.

The water-soluble monomers A2 advantageously have the following general formula:

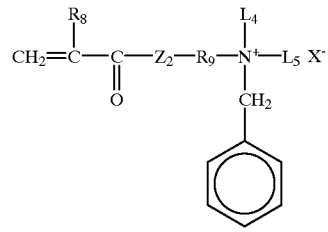

in which $R_8$ is H or methyl, $Z_2$ is 0, NH or $NR_{10}$, wherein $R_{10}$ is a $C_{1-6}$ alkyl or hydroxyalkyl or $C_{5-12}$ cycloalkyl radical, $R_9$ is a $C_{1-6}$ alkylene or hydroxyalkylene radical, $L_4$ and $L_5$, which may be identical or different, are each a $C_{1-12}$ alkyl or hydroxyalkyl or $C_{5-12}$ cycloalkyl or $C_{6-12}$ aryl radical, and X is an ion, such as Cl, SCN, or the like.

The preferred monomer A2 according to the invention is acryloyloxyethyldimethylbenzylammonium chloride.

The amphiphilic comonomers are advantageously selected from among:

(i) compounds having the following general formula:

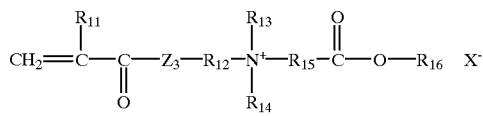

in which $R_{12}$ and $R_{15}$, which may be identical or different, are each a $C_{1-6}$ alkylene or hydroxyalkylene or $C_{5-12}$ cycloalkylene radical, $Z_3$ is O, NH or $NR_{17}$, wherein $R_{17}$ is a $C_{1-4}$ alkyl or cycloalkyl radical, $R_{11}$ is H or methyl, $R_{13}$, $R_{14}$ and $R_{16}$, which may be identical or different, are each a $C_{1-6}$ alkyl or hydroxyalkyl or $C_{5-12}$ cycloalkyl radical, and X is an ion, such as Cl, SCN, or the like;

(ii) compounds having the following general formula:

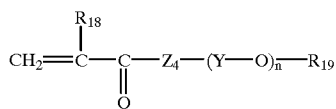

in which $R_{18}$ is H or methyl, $R_{19}$ is H or methyl, $Z_4$ is O, NH or $NR_{20}$, wherein $R_{20}$ is a $C_{1-6}$ alkyl or hydroxyalkyl radical, y is a $C_{1-4}$ alkylene radical, and n is a whole number ranging from 1 to 8.

The following are also considered amphiphilic monomers:

(iii) compounds A2 in which $R_{11}$ has from 7 to 12 carbon atoms, and $L_4$ and $L_5$, which may be identical or different, are each a $C_{1-12}$ alkyl or hydroxyalkyl or $C_{6-18}$ cycloalkyl or aryl radical;

(iv) compounds having the general formula:

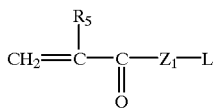

in which $R_5$ is H or $CH_3$, $Z_1$ is O, NH or $NR_6$, wherein $R_6$ is a $C_1$–$C_{16}$ alkyl or hydroxyalkyl radical, and

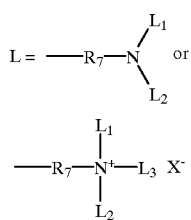

wherein $R_7$ is a $C_6$–$C_{18}$ alkylene radical and $L_1$, $L_2$ and $L_3$, which may be identical or different, are each a $C_6$–$C_{18}$ alkyl, $C_6$–$C_{18}$ cycloalkylene or $C_9$–$C_{18}$ arylalkylene radical.

The hydrophobic comonomers are advantageously selected from among:

(1) compounds having the following general formula:

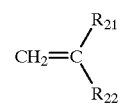

in which $R_{21}$ is H or a $C_{1-9}$ alkyl radical, and $R_{22}$ is a $C_{1-4}$ alkyl, $C_{5-12}$ cycloalkyl or $C_{6-12}$ radical;

(2) compounds having the following general formula:

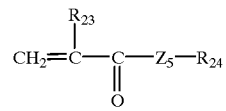

in which $R_{23}$ is H or $CH_3$, $Z_5$ is O, NH or $NR_{25}$, wherein $R_{25}$ is a $C_{1-4}$ alkyl radical, and $R_{24}$ is a $C_{1-9}$ alkyl, $C_{5-12}$ cycloalkyl or $C_{6-12}$ aryl radical.

In another embodiment, the dispersions of the invention are based on water-soluble polymers prepared by polymerizing:

from 70% to 100% by weight of at least one water-soluble monomer A1, from 0% to 30% by weight of at least one amphiphilic comonomer B, and from 0% to 30% by weight of at least one hydrophobic comonomer C, in the presence of a polymeric dispersant comprising maleic anhydride recurring structural units which is imidized and then salified.

In another embodiment, the dispersions are based on water-soluble polymers prepared by polymerizing:

from 70% to 100% by weight of at least one monomer A2, from 0% to 30% by weight of at least one comonomer A1, from 0% to 30% by weight of at least one comonomer B, and from 0% to 30% by weight of at least one comonomer C, dispersed in a polymeric dispersant D, such as polymers which comprise imidized and then neutralized or salified maleic anhydride, or poly(diallyldimethylammonium chloride).

The dispersing polymer D and the water-soluble polymer are incompatible. They must not form a blend when they are mixed together. The weight-average molecular weight of the dispersing polymer advantageously ranges from 500 to 500,000 and preferably from 1,000 to 400,000. The dispersing polymer D must have at least one functional group selected from among the following: ether, hydroxyl, carboxyl, amine, quaternary ammonium, imine, and the like. The dispersant can also be any copolymer containing one of the functional groups indicated above. It can be any copolymer prepared from one of the following monomers: maleic, fumaric or itaconic acids and the corresponding anhydrides, imides or quaternized imides, as well as (meth)acrylic acid and its salt, acrylamide or methacrylamide.

A characteristic dispersant according to the invention is poly(diallyldimethylammonium chloride), hereinafter denoted (poly-DADMAC), or, alternatively, the styrene/maleic anhydride copolymer imidized and salified by acetic acid, hereinafter denoted as (SMA+).

The water-soluble polymers can be synthesized via polymerization techniques well known to this art. The water-soluble polymers according to the invention are advantageously prepared by radical polymerization of the mixture containing at least one water-soluble monomer, optionally the amphiphilic monomer and optionally the hydrophobic monomer, in the presence of 1% to 30% and preferably of 2% to 15% of dispersing polymer. The monomer mixture typically constitutes from 10% to 40% and preferably from 15% to 30% of the water, monomers and dispersant mixture. The polymerization can be initiated by various means, such as by free radical generators, for example peroxides, diazo compounds or persulfates, or by irradiation. The preferred technique according to the invention is initiation by means of 2,2'-azobis(2-amidinopropane) chloride, hereinafter denoted as (ABAH). These initiators can be combined with a decomposition accelerator. The polymerization temperature advantageously ranges from 0° to 100° C. and preferably from 40° to 95° C. The polymerization time is usually on the order of 8 hours. The final conversion is greater than 95%.

In order to further illustrate the present invention and the advantages thereof, the following specific examples are given, it being understood that same are intended only as illustrative and in nowise limitative.

EXAMPLE 1

The procedure to follow is applicable to all tests carried out using SMA+ as the dispersing polymer.

277 parts of water, 9.5 parts of acetic acid and 52 parts of imidized styrene/maleic anhydride copolymer were introduced into a 1-liter reactor. The reactor was heated to 65° C. over 30 minutes under nitrogen. 89.5 parts of an 80% solution of acryloyloxyethyldimethylbenzylammonium chloride (Quat BZ) in water, 46.8 parts of 50% acrylamide (acryl) in water, 5 parts of butyl acrylate (BuA) and 0.01 part of ABAH, diluted in 5 parts of water, were then introduced. The temperature was maintained at 65° C. for 2 hours. 0.1 part of initiator, diluted in 10 parts of water, was then added again and the temperature was increased to 80° C. After reacting for 1 hour and a half at 80°, 0.025 part of initiator, diluted in 5 parts of water, was again added. After 1 hour and a half, the latter operation was repeated and the temperature was maintained for 1 hour. The mixture was then cooled to 30° C. and the reactor was emptied.

EXAMPLES 2 AND 3

The procedure of Example 1 was repeated, except that part of the acryloyloxyethyldimethylbenzylammonium chloride (Quat BZ) was replaced by acryloyloxyethyltrimethylammonium chloride (Quat MC).

EXAMPLE 4

The procedure of Example 1 was repeated, except that the amount of dispersing polymer was reduced.

EXAMPLE 5

The procedure of Example 1 was repeated, except that the hydrophobic monomer was eliminated.

The results of these tests are reported in Table 1 to follow.

Example 6 (Comparative)

201.3 parts of water, 171.3 parts of a 35% aqueous poly DADMAC solution, 62.5 parts of an 80% solution of Quat MC in water, 5 parts of butyl acrylate and 45 parts of acrylamide were introduced into a 1-liter reactor.

The mixture was heated to 65° C. under nitrogen. 0.01 part of ABAH, diluted in 5 parts of water, was then introduced. After reacting for 3 hours, the mixture was heated to 80° C., 0.1 part of ABAH, diluted in 10 parts of water, was then added and the reaction was allowed to continue for 1 hour and a half. The reactor was then cooled to 30° C. and emptied.

EXAMPLES 7 AND 8

The procedure of Comparative Example 6 was repeated, except that Quat MC was replaced by Quat BZ.

The results of tests 6, 7 and 8 are reported in Table 2 to follow:

TABLE 1

| Example | 1 | 2 | 3 | 4 | 5 |
|---|---|---|---|---|---|
| Active polymer, % composition | 20 Acryl/Quat BZX/BuA 23.4/71.6/5 | 20 Acryl/Quat BZ/MC/Bua 23.4/50.1/21.5/5 | 20 Acryl/Quat BZ/MC/BuA 23.4/50.1/21/5/5 | 20 Acryl/Quat BZ/BuA 23.4/71/6.6/5 | 20 Acryl/Quat BZ 28.4/71.6 |
| Dispersion polymer SMA+ (%) | 12 | 12 | 12 | 6 | 12 |
| Solids content | 32 | 32 | 32 | 26 | 32 |
| Active polymer/ Dispersing polymer Compatibility | incompatible | incompatible | incompatible | incompatible | incompatible |
| Fluidity | fluid | fluid | fluid | fluid | fluid |
| Viscosity (cP) | 5,500 | 28,600 | 66,000 | 3,500 | 13,000 |

TABLE 2

| Example | 6 | 7 | 8 |
|---|---|---|---|
| Active polymer, % composition | 20 Acryl/Quat Mc/BuA 45/50/5 | 20 Acryl/Quat BZ/Bua 45/50/5 | 20 Acryl/Quat BZ/MC/BuA 45/36.2/13.8.8/5 |
| Dispersion polymer (%) | Poly-DADMAC 12 | Poly-DADMAC 12 | Poly-DADMAC 12 |

TABLE 2-continued

| Example | 6 | 7 | 8 |
|---|---|---|---|
| Solids content | 32 | 32 | 32 |
| Active polymer/Dispersing polymer Compatibility | Compatible | Incompatible | Incompatible |
| Product appearance | Transparent gel | Opaque emulsion | Opaque emulsion |
| Fluidity | Non-fluid | Fluid | Fluid |
| Viscosity (cP) | >50,000 | 13,500 | 17,600 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A concentrated and low viscosity aqueous dispersion comprising the water-soluble aqueous phase polymerizate of from 70% to 100% by weight of at least one water-soluble monomer A, from 0% to 30% by weight of at least one amphiphilic comonomer B, and from 0% to 30% by weight of at least one hydrophobic comonomer C, in the presence of at least one polymeric dispersant incompatible therewith comprising SMA+, wherein the water-soluble aqueous phase polymerizate comprises recurring structural units derived from a monomer A2 having the general formula:

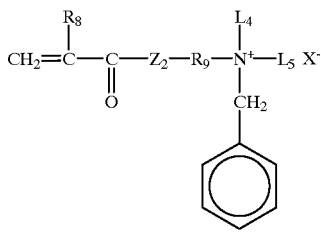

in which $R_8$ is H or methyl, $Z_2$ is O, NH or $NR_{10}$, wherein $R_{10}$ is a $C_{1-6}$ alkyl or hydroxyalkyl or $C_{5-12}$ cycloalkyl radical, $R_9$ is a $C_{1-6}$ alkylene or hydroxyalkylene radical, $L_4$ and $L_5$, which may be identical or different, are each a $C_{1-12}$ alkyl or hydroxyalkyl or $C_{5-12}$ cycloalkyl or $C_{6-12}$ aryl radical, and X is an ion.

2. The aqueous dispersion as defined by claim 1, comprising a stable opaque emulsion.

3. The aqueous dispersion as defined by claim 1, said at least one incompatible polymeric dispersant comprising poly(diallyldimethylammonium chloride).

4. The aqueous dispersion as defined by claim 1, said at least one incompatible polymeric dispersant comprising at least one ether, hydroxyl, carboxyl, amine, quaternary ammonium or imine functional group.

5. The aqueous dispersion as defined by claim 1, said at least one incompatible polymeric dispersant comprising at least one copolymer of maleic, fumaric or itaconic acid or anhydride thereof, of an imide or quaternized imide, of (meth)acrylic acid or salt thereof, or of acrylamide or methacrylamide.

6. The aqueous dispersion as defined by claim 1, said at least one incompatible polymeric dispersant having a weight-average molecular weight ranging from 500 to 500,000.

7. The aqueous dispersion as defined by claim 1, said water-soluble polymerizate comprising recurring structural units derived from a monomer A1 having the general formula:

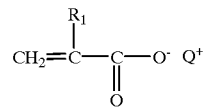

in which $R_1$ is H or methyl, and Q is a positive charged metal ion, or an ammonium ion NH+.

8. The aqueous dispersion as defined by claim 1, said water-soluble polymerizate comprising recurring structural units derived from a monomer A1 having the general formula:

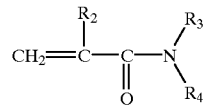

in which $R_2$ is H or methyl, and $R_3$ and $R_4$, which may be identical or different, are each H or a $C_{1-6}$ alkyl or hydroxyalkyl or $C_{5-12}$ cycloalkyl radical.

9. The aqueous dispersion as defined by claim 1, said water-soluble polymerizate comprising recurring structural units derived from a monomer A1 having the general formula:

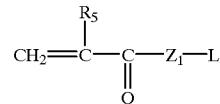

in which $R_5$ is H or $CH_3$, $Z_1$ is O, NH or $NR_6$, wherein $R_6$ is a $C_{1-6}$ alkyl or hydroxyalkyl radical, and:

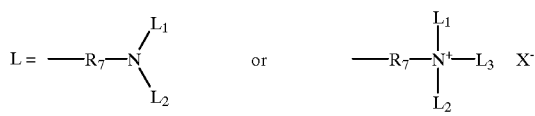

wherein $R_7$ is a $C_{1-6}$ alkylene or hydroxyalkylene radical and $L_1$, $L_2$ and $L_3$, which may be identical or different, are each H or a $C_{1-6}$ alkyl or hydroxyalkyl or $C_{5-12}$ cycloalkyl or $C_{6-12}$ arylalkyl radical, and X is an ion, and wherein monomer A1 is not the same as monomer A2.

10. The aqueous dispersion as defined by claim 1, said water-soluble polymerizate comprising recurring structural units derived from acrylamide.

11. The aqueous dispersion as defined by claim 1, said water-soluble polymerizate comprising recurring structural units derived from acryloyloxyethyldimethylbenzylammonium chloride.

12. The aqueous dispersion as defined by claim 1, said water-soluble polymerizate comprising up to 30% by weight of recurring structural units derived from an amphiphilic comonomer B having the general formula:

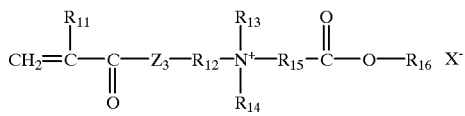

in which $R_{12}$ and $R_{15}$, which may be identical or different, are each a $C_{1-6}$ alkylene or hydroxyalkylene or $C_{5-12}$ cycloalkylene radical, $Z_3$ is O, NH or $NR_{17}$, wherein $R_{17}$ is a $C_{1-4}$ alkyl or cycloalkyl radical, $R_{11}$ is H or methyl, $R_{13}$, $R_{14}$ and $R_{16}$, which may be identical or different, are each a $C_{1-6}$ alkyl or hydroxyalkyl or $C_{5-12}$ cycloalkyl radical, and X is an ion.

13. The aqueous dispersion as defined by claim 1, said water-soluble polymerizate comprising up to 30% by weight of recurring structural units derived from an amphiphilic comonomer B having the general formula:

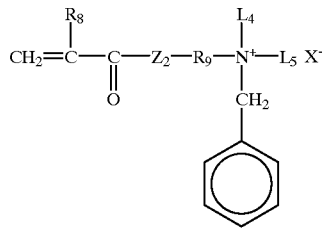

in which $R_8$ is H or methyl, $Z_2$ is O, NH or $NR_{10}$, wherein $R_{10}$ is a $C_{1-6}$ alkyl or hydroxyalkyl or $C_{5-12}$ cycloalkyl radical, $R_9$ is a $C_{1-6}$ alkylene or hydroxyalkylene radical, $L_4$ and $L_5$, which may be identical or different, are each a $C_{1-12}$ alkyl or hydroxyalkyl or $C_{6-18}$ cycloalkyl or aryl radical, and X is an ion.

14. The aqueous dispersion as defined by claim 1, said water-soluble polymerizate comprising up to 30% by weight of recurring structural units derived from an amphiphilic comonomer B having the general formula:

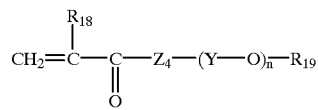

in which $R_{18}$ is H or methyl, $R_{19}$ is H or methyl, $Z_4$ is O, NH or $NR_{20}$, wherein $R_{20}$ is a $C_{1-6}$ alkyl or hydroxyalkyl radical, y is a $C_{1-4}$ alkylene radical, and n is a whole number ranging from 1 to 8.

15. The aqueous dispersion as defined by claim 1, said water-soluble polymerizate comprising up to 30% by weight of recurring structural units derived from an amphiphilic comonomer B having the general formula:

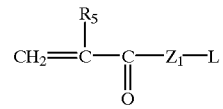

in which $R_5$ is H or $CH_3$, $Z_1$ is O, NH or $NR_6$, wherein $R_6$ is a $C_1$–$C_{16}$ alkyl or hydroxyalkyl radical, and

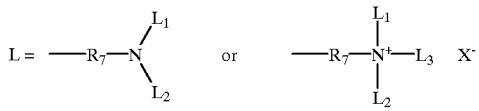

wherein $R_7$ is a $C_6$–$C_{18}$ alkylene radical and $L_1$, $L_2$ and $L_3$, which may be identical or different, are each a $C_6$–$C_{18}$ alkyl, $C_6$–$C_{18}$ cycloalkylene or $C_9$–$C_{18}$ arylalkylene radical, and X is an ion.

16. The aqueous dispersion as defined by claim 1, said water-soluble polymerizate comprising up to 30% by weight of recurring structural units derived from a hydrophobic comonomer C having the general formula:

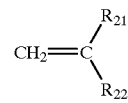

in which $R_{21}$ is H or a $C_{1-9}$ alkyl radical, and $R_{22}$ is a $C_{1-4}$ alkyl, $C_{5-12}$ cycloalkyl or $C_{6-12}$ radical.

17. The aqueous dispersion as defined by claim 1, said water-soluble polymerizate comprising up to 30% by weight of recurring structural units derived from a hydrophobic comonomer C having the general formula:

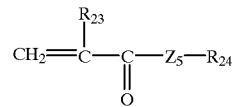

in which $R_{23}$ is H or $CH_3$, $Z_5$ is O, NH or $NR_{25}$, wherein $R_{25}$ is a $C_{1-4}$ alkyl radical, and $R_{24}$ is a $C_{1-9}$ alkyl, $C_{5-12}$ cycloalkyl or $C_{6-12}$ aryl radical.

18. The aqueous dispersion as defined by claim 1, comprising from 10% to 40% by weight of said water-soluble polymerizate.

19. The aqueous dispersion as defined by claim 18, comprising from 2% to 15% by weight of said at least one incompatible polymeric dispersant.

* * * * *